Figure 1:
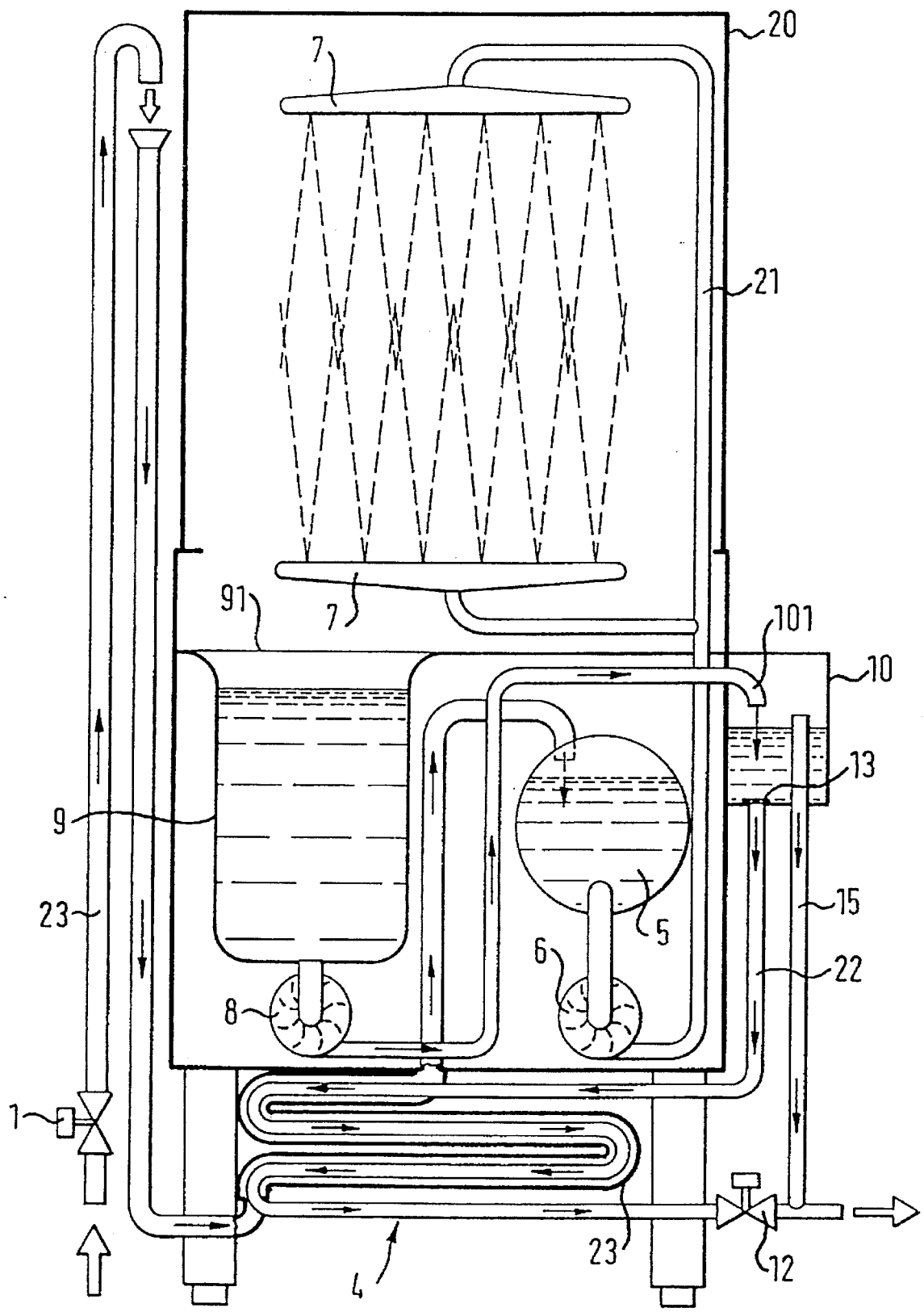

United States Patent [19]

Archer et al.

[11] Patent Number: 5,660,193
[45] Date of Patent: Aug. 26, 1997

[54] WASTE WATER HEAT RECOVERING UNIT AND DISHWASHING MACHINE

[75] Inventors: John Archer, Cranfield, England; Markus Wörter, Hohberg, Germany

[73] Assignee: Premark FEG L.L.C., Wilmington, Del.

[21] Appl. No.: 493,102

[22] Filed: Jun. 21, 1995

[30] Foreign Application Priority Data

Jun. 28, 1994 [DE] Germany .............................. 9410453 U

[51] Int. Cl.$^6$ ...................................................... B08B 3/10
[52] U.S. Cl. ........................ 134/56; 134/51 D; 134/58 D; 134/105; 134/108
[58] Field of Search ............................ 134/56 D, 57 D, 134/58 D, 105, 108

[56] References Cited

U.S. PATENT DOCUMENTS

| | | | |
|---|---|---|---|
| 4,512,811 | 4/1985 | Binnig et al. ............................ | 134/108 |
| 4,641,671 | 2/1987 | Nogi et al. ............................ | 134/57 D |
| 4,732,171 | 3/1988 | Milocco ................................ | 134/57 D |
| 4,783,223 | 11/1988 | Jenderichowski et al. .............. | 134/108 |
| 5,017,852 | 5/1991 | Nagata et al. ........................ | 134/57 D |

FOREIGN PATENT DOCUMENTS

| | | |
|---|---|---|
| 2319584 | 2/1977 | France . |
| 2641552 | 7/1990 | France . |
| 9114663 | 3/1993 | Germany . |
| 2271503 | 4/1994 | United Kingdom . |
| 8505576 | 12/1985 | WIPO . |

*Primary Examiner*—Frankie L. Stinson
*Attorney, Agent, or Firm*—Thompson Hine & Flory LLP

[57] ABSTRACT

The invention relates to a waste water heat recovering unit for preheating cold fresh water with already heated water, comprising a cleaning liquid tank (9) for collecting warm cleaning liquid, an intermediate tank (10) which is connected via a pipe (101) with the cleaning liquid tank (9), a pump (8) arranged in the pipe (101) which conveys at least part of the warm cleaning liquid from the cleaning liquid tank (9) into the intermediate tank (10), and a heat exchanger (4) which is connected, on the one hand, via a fresh water pipe (14) equipped with a volume controlling valve (1) to a fresh water connection for cold water and, on the other hand, to the intermediate tank (10) containing the warm cleaning liquid, a drain valve (12) being provided at the outlet of the heat exchanger (4) in the cleaning liquid guidance so that there flows through the heat exchanger (4) either substantially the same volume of cold fresh water as warm cleaning liquid from the intermediate tank (10), or only warm cleaning liquid with additional clear rinsing solution. In a second embodiment of a waste water heat recovering unit, instead of the drain valve (12), there is provided an intermittent pump (30) between the intermediate tank (10) and the heat exchanger (4) so that again there flows through the heat exchanger (4) substantially the same volume of cold fresh water as warm cleaning liquid from the intermediate tank (10), or only warm cleaning liquid with additional clear rinsing solution.

13 Claims, 3 Drawing Sheets

WASTE WATER HEAT RECOVERING UNIT AND DISHWASHING MACHINE

DESCRIPTION

The invention relates to a waste water heat recovering unit in which the heat energy from water already heated in a preceding operational step is used to prewarm cold fresh water. Further, the invention relates to a dishwashing machine which is useable, in particular, for commercial purposes, i.e. washes dishes, glass or the like in a washing program of approximately 50 to 90 seconds and rinses these with a clear, hot rinsing solution, only part of the heated washing or cleaning liquid being replaced in a normal program cycle by fresh water to be heated.

Washing machines with a waste water heat recovering unit of the mentioned kind are known. Such commercial washing machines are used to wash dishes and glasses upon which the food left-overs have not dried for too long, i.e. approximately a maximum of 30 to 40 minutes so that the dishes or glasses are cleaned by washing for approximately 50 to 90 seconds with warm cleaning liquid and a hot clear rinsing solution for 8 to 11 seconds. Since such dishwashing machines are in operation for the whole day or continuously, the clear rinsing solution and cleaning liquid, respectively, are internally cleaned again and newly used for washing for economical and environmental reasons. Only a certain portion is newly added as cold fresh water into the existing water circulation for hot clear rinsing in the final rinsing program. A waste water heat recovery unit with a heat exchanger in existing dishwashing machines is already known in order to use the heat energy of the removed warm cleaning liquid which corresponds to the newly added volume of fresh water. However, the newly added fresh water volume is not adapted in this case to the drained warm waste water volume; the time-related progression of the liquids flowing past each other in the heat exchanger is also not adapted accordingly. In the known waste water heat recovering units, this is because only one overflow is provided in the cleaning liquid tank for the warm cleaning liquid collected in the dishwasher and over which a volume of warm cleaning fluid at least corresponding to the volume of fresh water flows into an intermediate vessel and out of which it flows in turn via a removable screen and then through a coaxial heat exchanger which is exposed to a larger volume of supplied, static fresh water. In this manner, only a small portion of the heat energy of the overflowing cleaning liquid is used to heat up the cold fresh water. Additionally, the screen in the intermediate vessel must be removable in order to clean it of deposited food left-overs and fats.

Further, the known dishwashing machines of the mentioned type include the disadvantage that during the progression of the final program before the machine is switched off, the entire warm cleaning liquid is drained out of the cleaning liquid tank directly into a waste water system and the entire heat energy is therefore lost without being used.

The technical problem forming the basis of the invention consists in using the heat energy of the cleaning liquid in an optimal manner.

This technical problem is solved by a waste water heat recovering unit which has a cleaning liquid tank for collecting warm, dirty cleaning liquid and an intermediate tank connected via a feed pipe with the cleaning liquid tank, a pump being arranged in the feed pipe between the intermediate tank and the cleaning liquid tank in order to at least partially convey the warm cleaning liquid from the cleaning liquid tank into the intermediate tank. Additionally, a heat exchanger is provided which is connected at its one inlet via a fresh water feed pipe provided with a volume controlling valve to a fresh water connection for cold water and at its other inlet to the intermediate tank for the warm cleaning liquid, a drain valve being arranged at the outlet of the heat exchanger in the cleaning liquid guidance so that there flows through the heat exchanger either essentially simultaneously the same volume of cold fresh water as warm cleaning liquid from the intermediate tank, or only warm cleaning liquid.

The technical problem forming the basis of the invention is also solved by a waste water heat recovering unit which, in accordance with the above-described waste water heat recovering unit, has a cleaning liquid tank for collecting warm, dirty cleaning liquid and an intermediate tank connected via a feed pipe with the cleaning liquid tank and positioned within the washing machine, a pump being arranged in the feed pipe between the intermediate tank and the cleaning liquid tank in order to at least partially convey the warm cleaning liquid from the cleaning liquid tank into the intermediate tank and in which a heat exchanger is also provided which is connected at its one inlet via a fresh water feed pipe equipped with a volume controlling valve to a fresh water connection for cold water and at its other inlet with the intermediate tank for the warm cleaning liquid. In the inventive second waste water heat recovering unit, there is no drain valve arranged in the cleaning liquid guidance, but an intermittent pump is provided between the intermediate tank and the heat exchanger which is operated intermittently so that there flows through the heat exchanger either essentially simultaneously the same volume of cold fresh water as warm cleaning liquid from the intermediate tank, or only warm cleaning liquid.

It is achieved by means of the inventive first waste water heat recovering unit that the heat energy of the warm cleaning liquid being drained is transferred in an optimal manner to the newly added fresh water from the beginning when the drain valve and the volume controlling valve are opened such that fresh water flowing with approximately 14° C. into the heat exchanger is heated at its outlet to approximately 48° C. and the warm cleaning liquid of approximately 60° C. is cooled to approximately 26° C. at the outlet of the heat exchanger. On account of the inventive arrangement of the draining and volume controlling valves and the separation of the intermediate and cleaning liquid tanks which are connected with a pump in accordance with the invention, a predetermined cleaning liquid volume adapted to the fresh water volume to be supplied is pumped into the intermediate container and then supplied in an optimal manner with respect to time and volume to the heat exchanger. In this manner, a smaller dimensioning of the heat exchanger is made possible in comparison to the known state of the art.

In the case of the waste water heat recovering unit with an intermittent pump between the intermediate tank and the heat exchanger, it is possible to use the cleaning liquid drained through the heat exchanger not only to optimally utilize the heat energy of this cleaning liquid in that the same volume of warm cleaning liquid is supplied intermittently out of the intermediate tank into the heat exchanger as cold fresh water flows in counterflow through the heat exchanger, but the cleaning liquid can now also be fed into a drain which must not be provided near the bottom, but also far above this, for example for connection to a siphon arranged at a greater height. On account of the intermittent operation of the intermittent pump and the simultaneous opening of the previously described filling valve, essentially the same volume of fresh water flows into the heat exchanger as cleaning liquid pumped through the pump into the drain. The intermittent operation is chosen such that a small throughput volume of approximately 4 liters per minute can be maintained with the advantageous larger cross-sectional diameters of the pipes. A narrowing of the diameter of the pipes would lead to a blockage of the pipes on account of the depositing of entrained dirt particles, especially fat. A continuous operation of the pump would produce too large a flow of heated dirty water into the heat exchanger.

In the previously described inventive waste water heat recovering unit, it is also possible for the first time with the same cleaning performance and the same dimensions of the washing machine, on the one hand, to make the heater required to further heat the warmed fresh water smaller and, on the other hand, to arrange the heat exchanger within the dishwashing machine itself. This provides the considerable advantage that the entire dishwashing unit can be assembled in the factory, which was not possible up to now in the case of known dishwashing machines of the mentioned kind because the heat exchanger had to be so large to provide a sufficient heating of the cold fresh water that it could only be separately mounted and connected beside the actual washing machine at the destined location.

Advantageously, the heat exchanger is arranged beneath the intermediate tank or the cleaning liquid tank so that the dirty, warm cleaning liquid in the heat exchanger reaches up to a predetermined height in the intermediate tank when the drain valve is closed, which results in heat exchange taking place in an optimal manner from the input to the output of the fresh water in the heat exchanger. Further, with respect to the end program, it is made possible for the first time on account of the arrangement of the heat exchanger beneath the intermediate tank when the drain valve is open to pump the entire cleaning liquid volume with the inventive pump between the cleaning liquid tank and the intermediate tank into the intermediate tank and it then flows directly over the dirt screen and the bottom wall of the intermediate tank and all the fat, which has been also deposited in the heat exchanger, is carried out into the drainage system.

Optimally, a heat exchanger of the coaxial type is used in which a spirally wound outer pipe for the cold fresh water and an inner pipe for the heated cleaning liquids surrounded by this outer pipe are provided so that the dimensions of the heat exchanger can be further reduced.

Advantageously, the heat exchanger is constructed in such a manner that the cleaning liquid and the fresh water respectively flow in counterflows at approximately 3 to 5 l/min.

It is particularly advantageous for the previously mentioned reasons to shape the intermediate tank in such a manner that it has a deepest point at which the dirt screen is arranged for collecting the dirt particles included in the dirty cleaning liquid, and the feed pipe for the warm cleaning liquid from the cleaning liquid tank is arranged directly above the dirt screen of the intermediate tank so that an outflow takes place via the dirt screen and, in this manner, the warm cleaning liquid takes up dirt particles deposited at the dirt screen when the intermediate tank is empty and carries these into the waste water system.

It is particularly advantageous when the feed pipe in the intermediate tank additionally has one or more outflow openings above the container bottom of the intermediate tank so that the warm cleaning liquid from the cleaning liquid tank flows over the entire container bottom directly into the dirt screen when the intermediate tank is empty so that the entire container bottom of the intermediate tank is cleaned of deposited dirt residue.

A waste water heat recovering unit of the mentioned type is particularly advantageously provided in a commercially useable washing machine of the type initially described.

Figure 2:
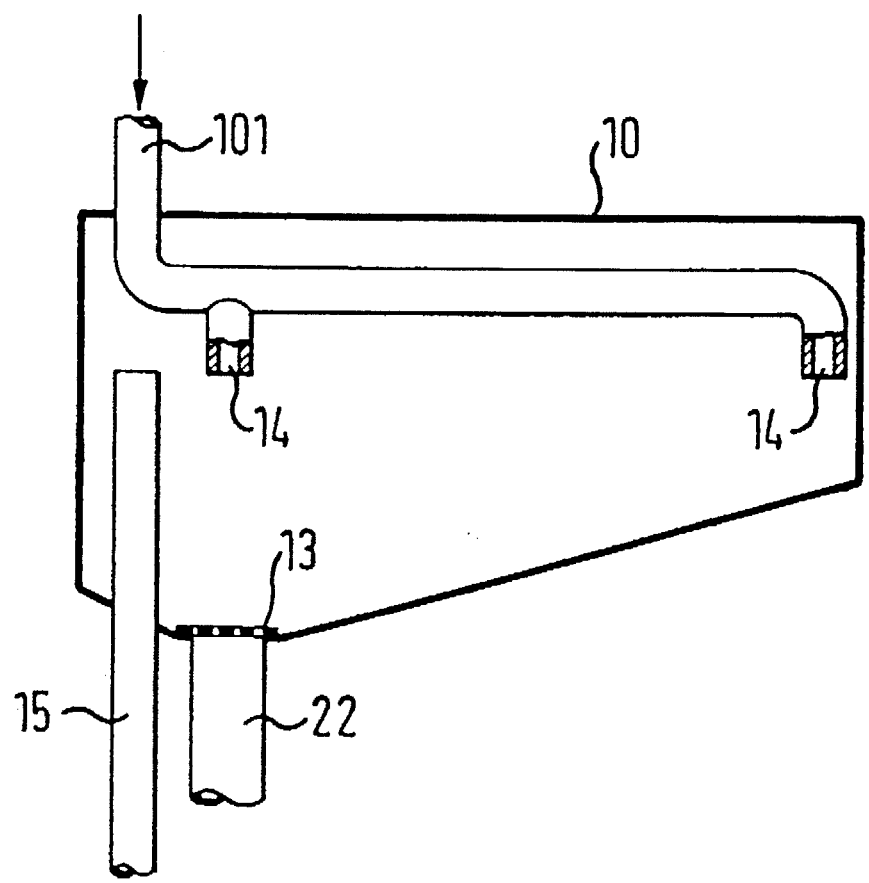
Figure 3:
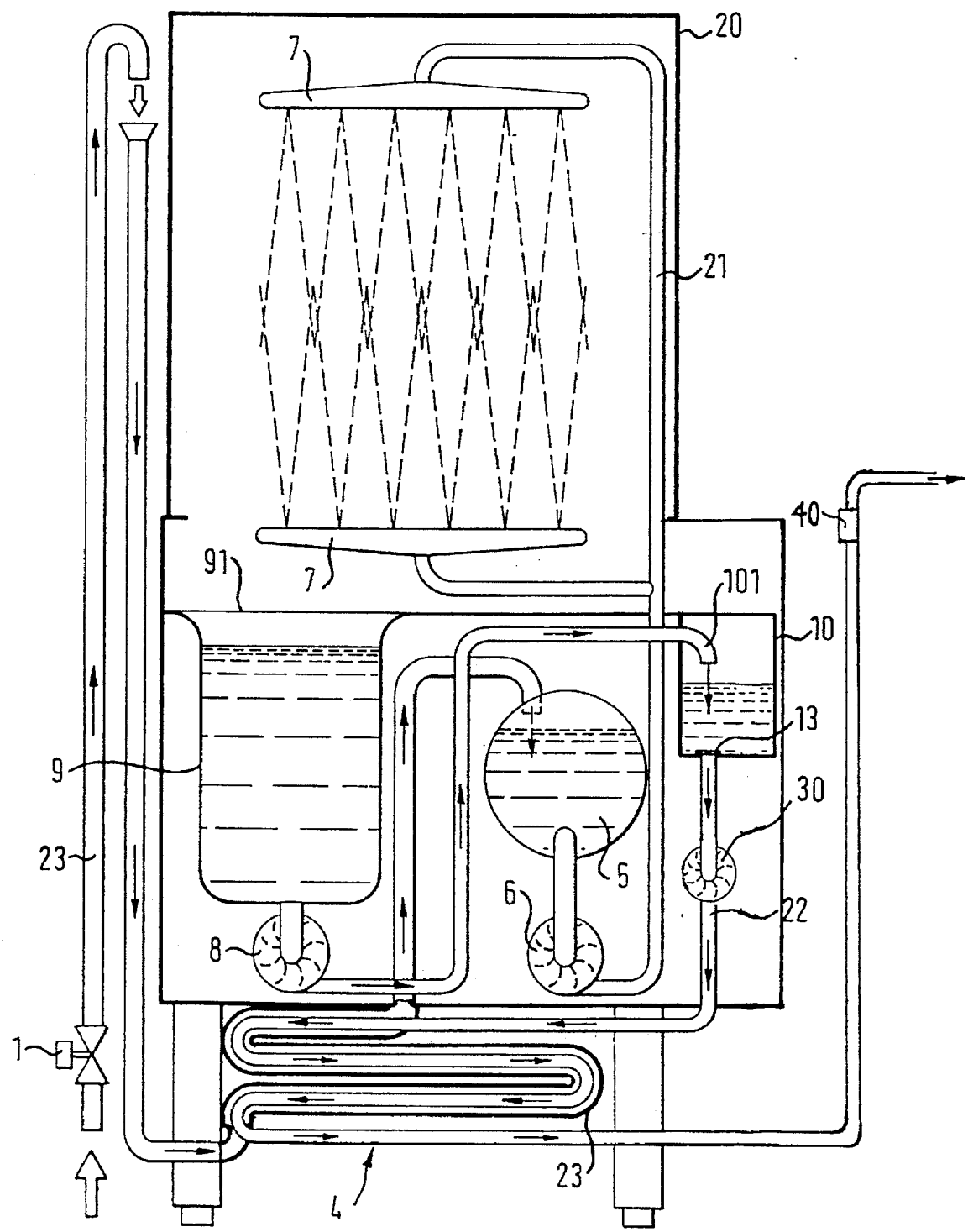

In the following, two exemplary embodiments are described and explained in more detail for better explanation and better understanding of the invention with reference to the enclosed drawings, in which:

FIG. 1 shows a schematic illustration of a dishwashing machine with an inventive first waste water heat recovering unit, FIG. 2 shows a cross section through an intermediate tank of the inventive waste water heat recovering units according to FIG. 1 and FIG. 3, and FIG. 3 shows a schematic illustration of a dishwashing machine with an inventive second waste water heat recovering unit.

As FIG. 1 shows, the dishwashing machine consists of a housing 20 into the upper half of which the dishes or glasses are inserted for cleaning. For this purpose, upper and lower clear cleaning devices 7 are provided which are connected by means of a feed pipe 21 with a heater 5. A rinsing pump 6 is arranged between the heater 5 and the cleaning devices 7 in the feed pipe 21. The cleaning area in the housing 20 is separated from the housing arranged beneath this by a dirt screen 91 which has an opening that is connected with a cleaning liquid tank 9 for the warm, dirty cleaning liquid. The cleaning liquid tank 9 has a emptying orifice aperture at its lowest point through which the water is supplied via a drain pump 8 and a supply line 101 to an intermediate tank 10. The intermediate tank 10 will be described in more detail with reference to FIG. 2.

A drain pump 22 leads from the intermediate tank 10 downwardly into a heat exchanger 4. This drain pump 22 is surrounded in the heat exchanger 4 by an external fresh water supply pipe 23, the forward end of which as seen in the direction of flow of the fresh water has a volume controlling valve 1 which is connected with a fresh water connection. The fresh water feed pipe 23 passes in a spiral manner through the heat exchanger 4 and ends in the heater 5. The end of the drain pipe 22 exiting the heat exchanger as seen in the direction of flow of the cleaning liquid has a drain valve 12 by means of which the drain pipe is either blocked or connected with a waste water channel. In this schematic illustration, the removal of the cleaning liquid out of the cleaning liquid tank 9 to the cleaning liquid circulation system is not shown.

It may be seen in FIG. 1 that the coaxial heat exchanger 4 is arranged in the bottom section of the housing 20 beneath all of the other devices of the dishwashing machine.

In the sectional view of the intermediate tank 10 shown in FIG. 2, it may be clearly seenrent that one outflow opening 14 is arranged above the dirt screen 13 of the intermediate tank 10 and another is provided at the edge of the intermediate tank 10. The intermediate tank 10 has a bottom which extends to the deepest point including the dirt screen 13, i.e. it has an inclined bottom wall. Additionally, an overflow 15 is provided in the intermediate tank 9 in order to enable continued operation of the dishwashing machine when the dirt screen 13 is blocked in that the cleaning liquid directly flows via the overflow 15 into the waste water system by circumventing the heat exchanger 4.

In operation of the dishwashing machine, the cleaning liquid tank 9 is filled with warm, dirty cleaning liquid having a temperature of approximately 58° to 65° C. A part of this, approximately 3 to 5 liters, is introduced by the drain pump 8 from the deepest point of the cleaning liquid tank 9 via the feed pipe 101 into the intermediate tank 10 via the outflow openings 14. Before this, the drain valve 12 of the dishwashing machine is closed so that heated cleaning liquid is already present in the entire inner pipe 22 and the lifting pipe up to the dirt screen 13. Simultaneously with the placing into operation of the volume controlling valve 1, the drain valve 12 is opened so that warm cleaning liquid flows through the inner pipe in the heat exchanger 4 into the drain channel and, simultaneously, in counterflow, the fresh water of approximately 10° to 17° flows in the outer pipe of the heat exchanger so that the heat energy of the warm cleaning liquid is transferred to the cold fresh water, and this leaves the heat exchanger at approximately 48° C. and is fed into the heater 5 where it is further heated to the required clear rinsing temperature of approximately 80° to 85°.

Since only a part of the warm cleaning liquid is pumped by the pump 8 from the cleaning liquid tank 9 into the intermediate tank 10 and the valves 12 and 1 are subsequently simultaneously opened during and after clear rinsing so that the same volume of warm cleaning liquid and cold fresh water flows in counter-flow through the heat exchanger, there is an optimal heat transfer and utilization of the heat energy of the cleaning liquid, which is otherwise lost, for heating the cold fresh water so that the heater 5 can also be dimensioned smaller. This is because the fresh water of only the small volume necessary for rinsing must be heated up to the required clear rinsing temperature of approximately 85° C.

Further, the heat energy of the warm cleaning liquid and a part of the clear rinsing solution is used in an optimal manner by the heater 5 in the evening to clean the intermediate tank, because the entire contents of the cleaning liquid tank 9 is pumped by the pump 8 when the drain valve 12 is opened and the volume controlling valve 1 is closed, and after the cleaning liquid tank is empty, clear rinsing solution is additionally pumped by pump 6 via the outflow openings 14 especially arranged above the dirt screen 13 and the bottom wall of the intermediate tank 10 so that the warm cleaning liquid and the hot clear rinsing solution convey the fats etc. which collected during the day from the bottom wall and the entire inner pipe wall of the heat exchanger 4 into the drain channel or the waste water system. On account of the fact that only warm cleaning water flows through the heat exchanger 4 when the volume controlling valve 1 is closed and the drain valve 12 is opened, the residue is dissolved in an optimal manner because this position of the valves results in no cooling of the cleaning liquid as is known in the state of the art and is disadvantageous for dissolving the food left-overs.

In the dishwashing machine shown in FIG. 3 comprising a waste water heat recovering unit, there is no drain valve 12 in comparison to the dishwashing machine illustrated in FIG. 1. Instead, an intermittent pump 30 is provided in the drain pipe 22 between the intermediate tank 10 and the heat exchanger 4. Further, in comparison to the dishwashing machine illustrated in FIG. 1, the drain is not in the vicinity of the bottom, but is provided at a greater height above the bottom, and the safety overflow 15 is no longer required since the intermediate container is inside the housing 20. The additional elements of the dishwashing machine with an inventive waste water heat recovering unit illustrated in FIG. 3 correspond to those in the dishwashing machine shown in FIG. 1. Therefore, no further explanation of these is necessary here.

Additionally, in the second embodiment of the waste water heat recovering unit illustrated in FIG. 3, a return valve 40 can be advantageously provided ahead of the inlet into the siphon so as to prevent the water present up to the intermittent pump 30 in the pipe 22 from flowing away when underpressure prevails in the siphon.

In the second embodiment of the inventive waste water heat recovering unit, simultaneously with the opening of the volume controlling valve 1 which controls the supply of fresh water, the intermittent pump 30 is operated intermittently, i.e. cyclically according to requirements, so that essentially simultaneously the same volume of fresh water flows through the heat exchanger 4 as there is warm cleaning liquid pumped out of the intermediate tank 10. In this manner, as in the case of the first embodiment, an optimum heat exchange is made possible in the heat exchanger 4 and the cool fresh water is preheated in an optimal manner.

We claim:

1. A waste water heat recovering unit for preheating cold fresh water with already heated water, comprising a cleaning liquid tank (9) for collecting warm cleaning liquid, an intermediate tank (10) which is connected via a pipe (101) with the cleaning liquid tank (9), a pump (8) arranged in the pipe (101) which at least partially conveys the warm cleaning liquid from the cleaning liquid tank (9) into the intermediate tank (10), and a heat exchanger (4) which is connected, on the one hand, via a fresh water pipe (14) provided with a volume controlling valve (1) to a fresh water connection for cold water and, on the other hand, to the intermediate tank (10) containing the warm cleaning liquid, a drain vavle (12) being arranged at the outlet of the heat exchanger (4) in the cleaning liquid guidance so that there flows through the heat exchanger (4) either substantially the same volume of cold fresh water as warm cleaning liquid from the intermediate tank (10), or only warm cleaning liquid with additional c;ear rinsing solution.

2. A unit according to claim 1, characterized in that the heat exchanger (4) is arranged beneath the intermediate tank (10) so that in the case of the drain valve (12) being in the closed state or in the case of a drain arranged at a greater height above the bottom, the dirty, warm cleaning liquid stands in the heat exchanger (4) and up to a predetermined height in the intermediate tank (10).

3. A unit according to claim 1, characterized in that the heat exchanger (4) is of the coaxial type in which an outer spirally wound pipe for the cold fresh water and an inner pipe for the warm cleaning liquid surrounded by this outer pipe are provided.

4. A unit according to claim 1, characterized in that the cleaning liquid and the fresh water flow at 3 to 5 l/min through the heat exchanger (4).

5. A unit according to claim 1, characterized in that the intermediate tank (10) has a deepest point at which a dirt screen (13) is arranged for collecting the dirt particles entrained in the dirty cleaning water and the pipe (101) has an outflow opening arranged above the dirt screen (13) through which the warm, dirty cleaning liquid flows in the case of an empty intermediate tank (10) out of the cleaning liquid tank (9) into the intermediate tank (10) directly above the dirt screen (13).

6. A unit according to claim 5, characterized in that the pipe (101) has one or more outflow openings above the container bottom of the intermediate tank (10) such that in the case of an empty intermediate tank (10), warm cleaning liquid from the cleaning liquid tank (9) flows across the entire container base into the dirt screen (13).

7. A washing machine in which only a part of the water used for washing is replaced by newly supplied fresh water, comprising a waste water heat recovering unit according to claim 1.

8. A waste water heat recovering unit for preheating cold fresh water with already heated water, comprising

- a cleaning liquid tank (9) for collecting warm cleaning liquid,
- an intermediate tank (10) which is connected via a pipe (101) with the cleaning liquid tank (9),
- a pump (8) arranged in the pipe (101) which at least partially conveys the warm cleaning liquid from the cleaning liquid tank (9) into the intermediate tank (10), and
- a heat exchanger (4) which is connected, on the one hand, via a fresh water pipe (14) provided with a volume controlling valve (1) to a fresh water connection for cold water and, on the other hand, to the intermediate tank (10) containing the warm cleaning liquid, an intermittent pump (30) being arranged in the cleaning liquid guidance between the intermediate tank (10) and the heat exchanger (4) so that in the case of intermittent operation of the intermittent pump (30), there flows through the heat exchanger (4) essentially the same volume of cold fresh water as warm cleaning liquid from the intermediate tank (10), or only warm cleaning liquid with additional clear rinsing solution.

9. The unit according to claim 8, characterized in that the heat exchanger (4) is coaxial in which an outer spirally wound pipe for the cold fresh water and an inner pipe for the warm cleaning liquid surrounded by this outer pipe are provided.

10. The unit according to claim 8, characterized in that the cleaning liquid and the fresh water flow at 3 to 5 l/min through the heat exchanger (4).

11. The unit according to claim 8, characterized in that the intermediate tank (10) has a deepest point at which a dirt screen (13) is arranged for collecting the dirt particles entrained in the dirty cleaning water and the pipe (101) has an outflow opening arranged above the dirt screen (13) through which the warm, dirty cleaning liquid flows in the case of an empty intermediate tank (10) out of the cleaning liquid tank (9) into the intermediate tank (10) directly above the dirt screen (13).

12. The unit according to claim 11, characterized in that the pipe (101) has one or more outflow openings above the container bottom of the intermediate tank (10) such that in the case of an empty intermediate tank (10), warm cleaning liquid from the cleaning liquid tank (9) flows across the entire container base into the dirt screen (13).

13. A washing machine in which only a part of the water used for washing is replaced by newly supplied fresh water, comprising a waste water heat recovery unit according to claim 8.

* * * * *